United States Patent
Park et al.

(10) Patent No.: US 9,825,685 B1
(45) Date of Patent: Nov. 21, 2017

(54) SYSTEMS AND METHODS FOR PERFORMING BEAM FORMING AT MULTIPLE ACCESS NODES

(71) Applicant: Sprint Spectrum LP, Overland Park, KS (US)

(72) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 259 days.

(21) Appl. No.: 14/541,611

(22) Filed: Nov. 14, 2014

(51) Int. Cl.
*H04W 72/04* (2009.01)
*H04B 7/06* (2006.01)
*H04B 7/024* (2017.01)
*H04B 7/0404* (2017.01)

(52) U.S. Cl.
CPC .......... *H04B 7/0628* (2013.01); *H04B 7/024* (2013.01); *H04B 7/0404* (2013.01); *H04B 7/0617* (2013.01)

(58) Field of Classification Search
CPC ... H04W 72/042; H04W 72/12; H04W 72/04; H04B 7/0617
See application file for complete search history.

(56) References Cited

U.S. PATENT DOCUMENTS

| | | | |
|---|---|---|---|
| 8,369,791 B2 | 2/2013 | Hafeez | |
| 8,442,566 B2 | 5/2013 | Liu et al. | |
| 8,543,063 B2 | 9/2013 | Bergel et al. | |
| 8,570,963 B2 | 10/2013 | Barany et al. | |
| 2013/0039349 A1 | 2/2013 | Ebrahimi Tazeh Mahalleh et al. | |
| 2013/0201937 A1 | 8/2013 | Sun et al. | |
| 2013/0286960 A1* | 10/2013 | Li | H04W 72/042 370/329 |
| 2014/0177683 A1* | 6/2014 | Krishnamurthy | H04B 7/0469 375/219 |
| 2014/0307654 A1* | 10/2014 | Kim | H04B 7/0617 370/329 |

* cited by examiner

*Primary Examiner* — Wei Zhao (57) ABSTRACT

Systems and methods are described for performing beam forming at multiple access nodes. A first access node may receive a signal level from a wireless device that fails to meet a signal level criteria. It may be determined that beam forming is enabled at the first access node. Beam forming data may then be communicated between the first access node and a second access node. It may also be determined whether coordinated multipoint transmissions are enabled at the first access node. Beams transmitted from the first access node and the second access node may be adjusted based on whether coordinated multipoint transmissions are enabled from the first access node.

16 Claims, 7 Drawing Sheets

SYSTEMS AND METHODS FOR PERFORMING BEAM FORMING AT MULTIPLE ACCESS NODES

TECHNICAL BACKGROUND

Telecommunication systems, such as cellular networks or other wireless networks, use various network links throughout the network to communicate. For example, an access node may use a network link to communicate with another access node while using a separate network link to communicate with another processing node. Accordingly, the system may rely on a well-established network to provide efficient communication services.

In certain circumstances, a portion of the network may experience high load (e.g., load above a threshold) or interference conditions. For example, a communication link may experience a large amount of data traffic or interference conditions may render a communication link less effective, and the efficiency of the system may suffer. Accordingly, a system that effectively balances load and considers interference conditions may be able to provide a high quality service to users of the system.

Overview

Systems and methods are described for performing beam forming at multiple access nodes. A first access node may receive a signal level from a wireless device that fails to meet a signal level criteria. It may be determined that beam forming is enabled at the first access node. Beam forming data may then be communicated between the first access node and a second access node. It may also be determined whether coordinated multipoint transmissions are enabled at the first access node. Beams transmitted from the first access node and the second access node may be adjusted based on whether coordinated multipoint transmissions are enabled from the first access node.

DETAILED DESCRIPTION

Figure 1:
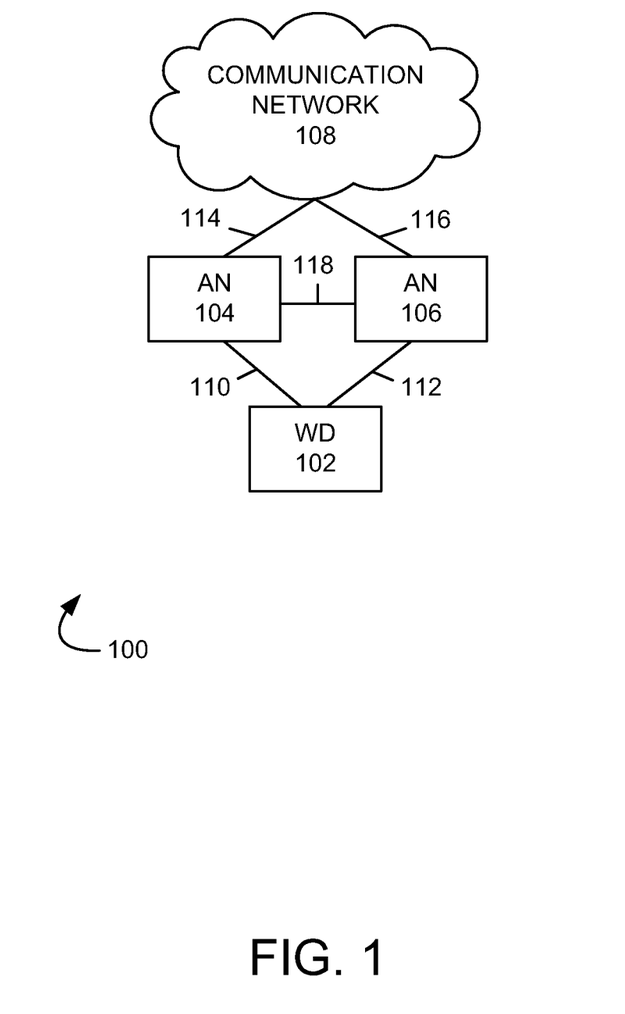
FIG. 1 illustrates an exemplary communication system to perform beam forming at multiple access nodes.

FIG. 1 illustrates an exemplary communication system 100 to perform beam forming at multiple access nodes comprising wireless devices 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 104 and 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, and an eNodeB device. Access nodes 104 and 106 may communicate with communication network 108 over communication links 114 and 116 respectively. Access nodes 104 and 106 may also communicate directly with each other over communication link 118.

Although only access nodes 104 and 106 are illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2A:
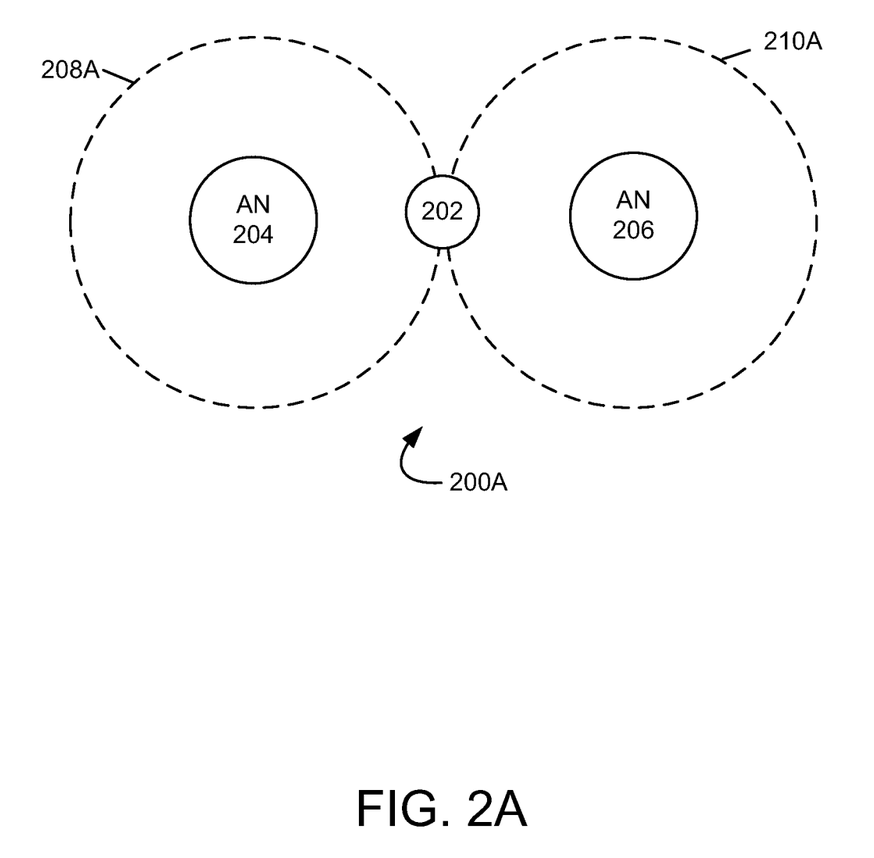
FIGS. 2A-2C illustrate exemplary systems to perform beam forming at multiple access nodes.
Figure 2B:
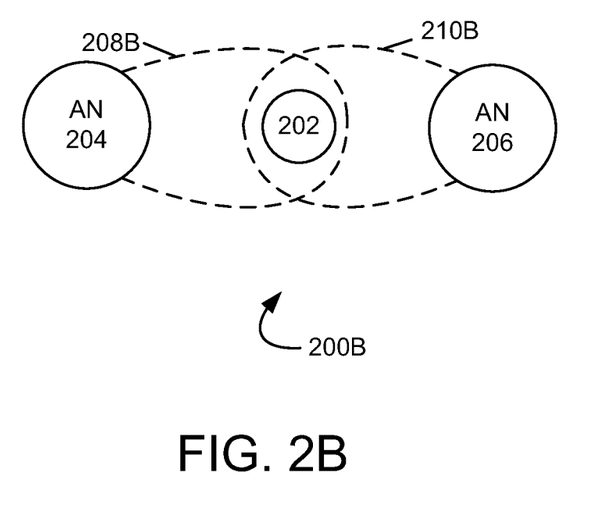
Figure 2C:
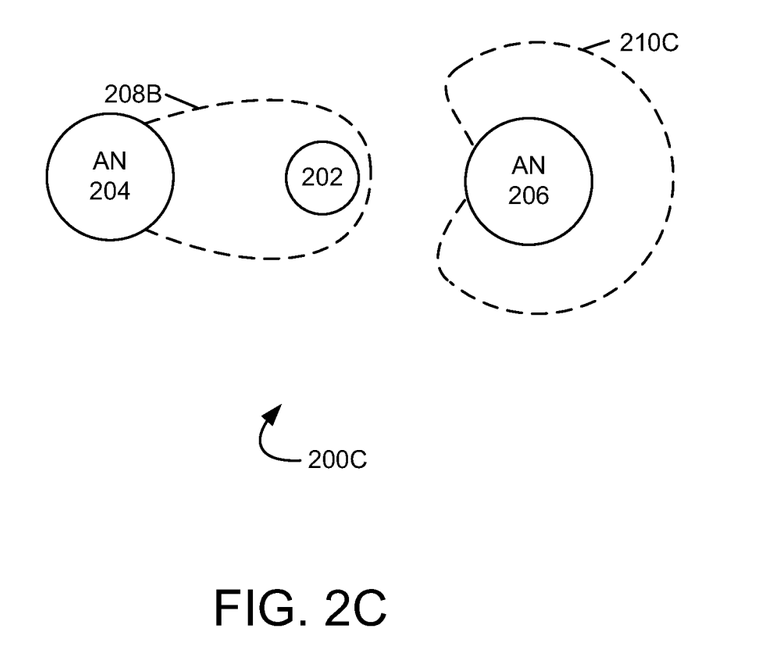

FIGS. 2A-2C illustrate exemplary communication systems 200A, 200B, and 200C for performing beam forming at multiple access nodes. Systems 200A, 200B, and 200C comprise wireless device 202, access nodes 204 and 206, signal areas 208A and 210A, and adjusted signal beams, 208B, 210B, 208C, and 210C. Wireless device 202 may comprise a device similar to wireless device 102. Access nodes 204 and 206 may comprise access nodes similar to access nodes 104 and 106.

In operation, access node 204 may establish communication with wireless device 202 such that access node 204 provides the wireless device access to a communication network (e.g., communication network 110). Signal areas 208A and 210A may comprise areas around each of access nodes 204 and 206 where a wireless device may detect wireless signals transmitted from the access node at a signal level above a threshold. For example, signal areas 208A and 210A may comprise coverage areas for access nodes 204 and 206 respectively, such that wireless devices that fall within the signal areas are provided wireless resources by the respective access node.

In an embodiment, systems 200A, 200B, and 200C may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, systems 200A, 200B, and 200C may leverage beam forming to enhance the wireless services provided to wireless device 202. For example, wireless device 202 may be located at the edge of signal area 208A. Accordingly, the wireless device may comprise a low channel quality (e.g., a channel quality indicator (CQI) below a threshold). The low channel quality may be based on a high interference level for the signals received by wireless device 202, or other suitable factors. In an embodiment, access node 204 may perform beam forming such that a signal transmitted to wireless device 202 is adjusted based on the location of the wireless device. For example, an adjusted beam 208B may be transmitted from access node 204 such that wireless device 202 may experience greater channel quality when communicating with access node 204. In an embodiment, the adjusted beam 208B may comprise of signals transmitted over a frequency band assigned to wireless device 202 (e.g., assigned as the frequency band that access node 204 uses to communicate with wireless device 202).

In an embodiment, beam forming may be accomplished using a plurality of antennas at access node 204 that implement, for example, a multiple input multiple output (MIMO) protocol. The signals from each of the plurality of antennas may be controlled such that the net signal from the access node may be transmitted towards wireless device 202 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 202 and destructive interference in other directions (e.g., away from wireless device 202). In another example, the signals may be weighed such that the emitted waveform from the antennas experiences destructive interference in the direction of wireless device 202.

System 200B shows access nodes 204 and 206 adjusting beams emitted by each access node towards wireless device 202. For example, adjusted signal beams 208B and 210B may be narrowed towards the location of wireless device 202. System 200C shows access node 204 adjusting the beam emitted by the access node towards wireless device 202 and access node 206 adjusting the beam emitted by the access node away from wireless device 202. For example, adjusted signal beam 208C may be narrowed towards the location of wireless device 202 and adjusted signal beam 210C may be adjusted such that the beam is not transmitted towards the location of wireless device 202. In an embodiment, the adjusted beams 208B, 210B, 208C, and 210C may comprise of signals transmitted over a frequency band assigned to wireless device 202 (e.g., assigned as the frequency band that access node 204 uses to communicate with wireless device 202).

In an embodiment, systems 200A, 200B, and 200C may also use a coordinated multipoint transmission to provide enhanced service to wireless device 202. Access nodes 204 and 206 may coordinate when communicating with wireless device 202. For example, access node 204 may transmit data to wireless device 202 using a particular frequency band and/or during a particular transmission time, and access node 206 may actively refrain from transmitting signals over the particular frequency band and/or during the particular transmission time such that the interference experienced by wireless device 202 may be reduced. In another example, access nodes 204 and 206 may each transmit signals to wireless device 202, where at least a portion of the signals comprise redundant data, such that wireless device 202 may achieve a higher data rate when receiving transmissions.

In an embodiment, systems 200A, 200B, and 200C may use both coordinated multipoint transmissions and beam forming for transmission to wireless devices. For instance one or both of coordinated multipoint transmissions and beam forming may be enabled at access node 204 or access node 206. Accordingly, access nodes that determine how to transmit beam formed signals and/or coordinated multipoint transmissions to a wireless device may provide enhanced wireless services to that wireless device.

Systems and methods are described for performing beam forming at multiple access nodes. A first access node may receive a signal level from a wireless device that fails to meet a signal level criteria. It may be determined that beam forming is enabled at the first access node. Beam forming data may then be communicated between the first access node and a second access node. It may also be determined whether coordinated multipoint transmissions are enabled at the first access node. Beams transmitted from the first access node and the second access node may be adjusted based on whether coordinated multipoint transmissions are enabled from the first access node.

Figure 3:
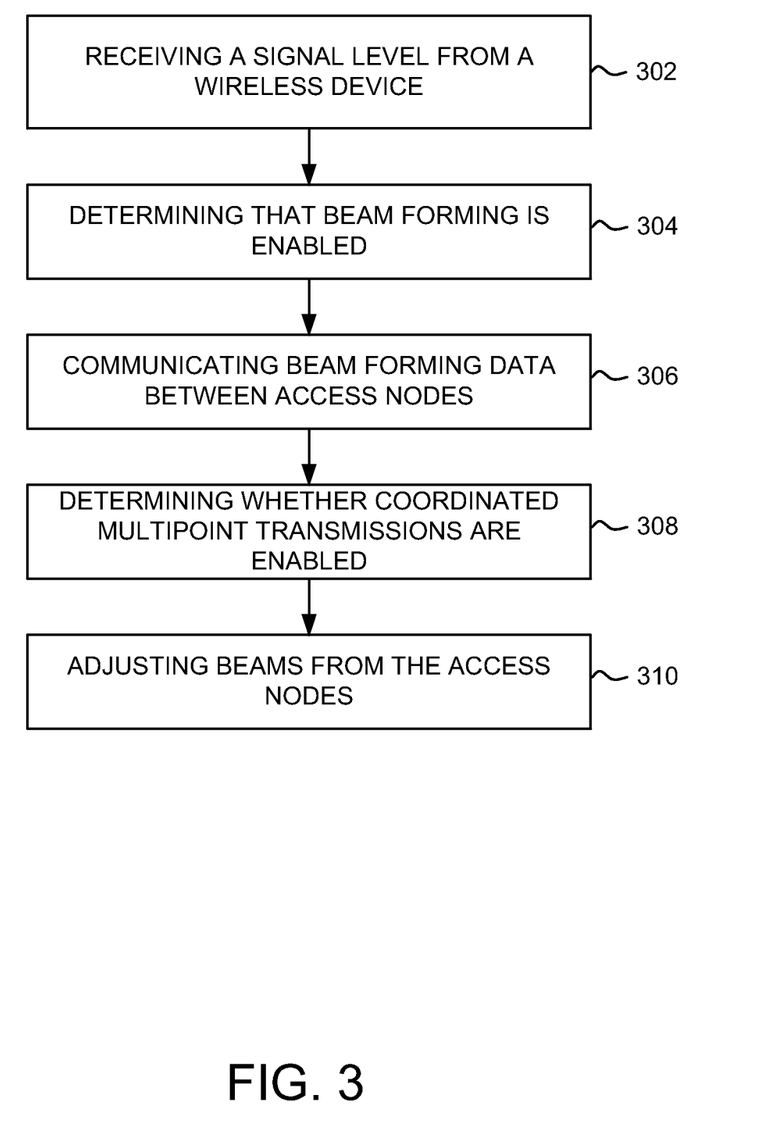
FIG. 3 illustrates an exemplary method of performing beam forming at multiple access nodes.

FIG. 3 illustrates an exemplary method for performing beam forming at multiple access nodes. The method will be discussed with reference to the exemplary communication system 200 illustrated in FIG. 2, however, the method can be implemented with any suitable communication system.

Referring to FIG. 3, at step 302, a signal level may be received from a wireless device at a first access node, where the signal level fails to meet a signal level criteria. For example, access node 204 may receive a signal level from wireless device 202. The signal level may comprise an indicator for a signal received at wireless device 202 from access node 204. In an embodiment, the signal level may comprise a channel quality indicator (CQI). The received CQI may be compared to a signal level criteria. For example, the signal level criteria may comprise a threshold signal level. A CQI that fails to meet the threshold may indicate poor channel quality for the wireless device. A CQI received at access node 204 from wireless device 202 may fail to meet the signal level criteria.

At step 304, it may be determined that beam forming is enabled at the first access node. For example, it may be determined that beam forming is enabled at access node 204. In an embodiment, beam forming may be enabled based on conditions at the access node, such as load, number of connections to wireless devices (e.g., RRC connections), channel quality for connected wireless devices, application requirements from wireless devices, and other suitable conditions.

At step 306, beam forming data may be communicated between the first access node and a second access node. For example, beam forming data may be communicated between access node 204 and access node 206. Beaming forming data may comprise a weights for antennas, phase and/or amplitudes for signals, pre-coding matrix indicators (PMIs), sounding reference signal (SRS) values, and the like.

At step 308, it may be determined whether coordinated multipoint transmissions are enabled at the first access node. For example, it may be determined whether coordinated multipoint transmissions are enabled at access node 204. In an embodiment, coordinated multipoint transmissions may be enabled based on conditions at the access node, such as load, number of connections to wireless devices (e.g., RRC connections), channel quality for connected wireless devices, application requirements from wireless devices, conditions at neighboring access nodes (e.g., access node 206), and other suitable conditions.

At step 310, beams transmitted from the first access node and the second access node may be adjusted based on whether coordinated multipoint transmissions are enabled from the first access node. For examples, beams from access nodes 204 and 206 transmitted to wireless device 202 may be adjusted based on whether coordinated multipoint transmission are enabled from the access node 204. In an embodiment, one of 208B and 208C may comprise the adjusted beam from access node 204 and one of 208C and 210C may comprise the adjusted beam from access node 206. The adjusted beams may be transmitted over a frequency band assigned to wireless device 202 (e.g., assigned as the frequency band that access node 204 uses to communicate with wireless device 202).

Figure 4:
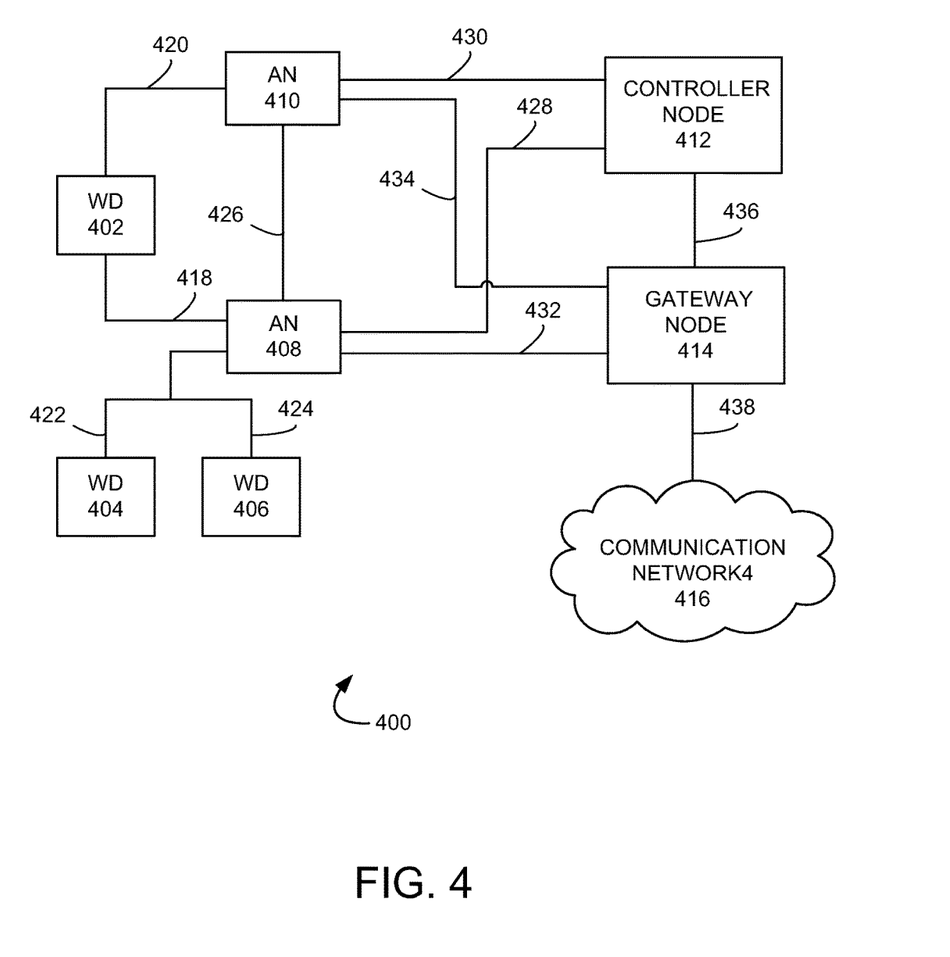
FIG. 4 illustrates another exemplary system to perform beam forming at multiple access nodes.

FIG. 4 illustrates another exemplary communication system 400 to perform beam forming at multiple access nodes. Communication system 400 may comprise wireless devices 402, 404 and 406, access nodes 408 and 410, controller node 412, gateway node 414, communication network 416, and communication links 418, 420, 422, 424, 426, 428, 430, 432, 434, 436, and 438. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402, 404, and 406 can be any device configured to communicate over communication system 400 using a wireless communication link. For example, wireless devices 402, 404, and 406 can include a cell phone, a smart phone, a computing platform such as a laptop, palmtop, or a tablet, a personal digital assistant, or an internet access device, and combinations thereof.

Access nodes 408 and 410 are network nodes capable of providing wireless communications to wireless devices 402, 404, and 406, and can be, for example, a base transceiver station, a radio base station, or an eNodeB device. In an embodiment, access node 408 can comprise a serving access node for wireless device 402, 404, and 406. Access nodes 408 and 410 may communicate with controller node 412 over communication links 428 and 430, respectively, and with gateway node 414 over communication links 432 and 434, respectively. Access nodes 408 and 410 may also communicate directly with each other over communication link 426.

Controller node 412 can be any network node configured to manage services within system 400. Controller node 412 may provide other control and management functions for system 400. The controller node 412 can be a single device having various functions or a plurality of devices having differing functions. For example, controller node 412 can include at least one of a multi-cell/multicast coordination entity (MCE), a mobility management entity (MME), a radio network controller (RNC), a mobile switching center (MSC), and a combination thereof.

Controller node 412 can comprise a processor and associated circuitry to execute or direct the execution of computer-readable instructions to obtain information. Controller node 412 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 412 can receive instructions and other input at a user interface. Controller node 412 can comprise a processor and associated circuitry to execute or direct the execution of computer-readable instructions to obtain information.

Gateway node 414 is a network element which can comprise a processor and associated circuitry to execute or direct the execution of computer-readable instructions. Gateway node 414 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 414 can provide instructions to access nodes 408 and 410 related to channel selection in communications with wireless devices 402, 404, and 406. For example, gateway node 414 can comprise at least one of a serving gateway (SGW), a packet data network gateway (PDNGW), a cellular gateway (CGW), and a combination thereof.

Communication network 416 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 416 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 416 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 418, 420, 422, 424, 426, 428, 430, 432, 434, 436, and 438 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 408 and 410, controller node 412, gateway node 414, and communication network 416 which are omitted for clarity, including additional processing nodes, routers, gateways, and physical and/or wireless data links for carrying data among the various network elements. In an embodiment, any of controller node 412, gateway node 414, and one or more modules of access nodes 408 and/or 410 may perform all or parts of the methods of FIGS. 3 and 5.

In operation, access node 408 may establish communication with wireless devices 402, 404, and 406 such that access node 408 provides the wireless devices access to a communication network (e.g., communication network 416). In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 400 may leverage beam forming to enhance the wireless services provided to wireless device 402. For example, wireless device 402 may be located at the edge of a signal area for access node 408. Accordingly, the wireless device may comprise a low channel quality (e.g., a channel quality indicator (CQI) below a threshold). The low channel quality may be based on a high interference level for the signals received by wireless device 402, or other suitable factors. In an embodiment, access node 408 may perform beam forming such that a signal transmitted to wireless device 402 is adjusted based on the location of the wireless device. For example, an adjusted beam (e.g., adjusted beam 208B of FIG. 2) may be transmitted from access node 408 such that wireless device 402 may experience greater channel quality when communicating with access node 408. In an embodiment, the adjusted beam may comprise of signals transmitted over a frequency band assigned to wireless device 402 (e.g., assigned as the frequency band that access node 408 uses to communicate with wireless device 402).

In an embodiment, the beam forming may be accomplished using a plurality of antennas at access node 408 that implement, for example, a multiple input multiple output (MIMO) protocol. The signals from each of the plurality of antennas may be controlled such that the net signal from the access node may be transmitted towards wireless device 402 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 402 and destructive interference in other directions (e.g., away from wireless device 402). In another example, the signals may be weighed such that the emitted waveform from the antennas experiences destructive interference in the direction of wireless device 402.

In an embodiment, system 400 may also use a coordinated multipoint transmission to provide enhanced service to wireless device 402. Access nodes 408 and 410 may coordinate when communicating with wireless device 402. For example, access node 408 may transmit data to wireless device 402 using a particular frequency band and/or during a particular transmission time, and access node 410 may actively refrain from transmitting signals over the particular frequency band and/or during the particular transmission time such that the interference experienced by wireless device 402 may be reduced. In another example, access nodes 408 and 410 may each transmit signals to wireless device 402, where at least a portion of the signals comprise redundant data, such that wireless device 402 may achieve a higher data rate when receiving transmissions.

In an embodiment, system 400 may use both coordinated multipoint transmissions and beam forming for transmission to wireless devices. For instance one or both of coordinated multipoint transmissions and beam forming may be enabled at access node 408 or access node 410. Accordingly, access nodes that determine how to transmit beam formed signals and/or coordinated multipoint transmissions to a wireless device may provide enhanced wireless services to that wireless device.

Systems and methods are described for performing beam forming at multiple access nodes. A first access node may receive a signal level from a wireless device that fails to meet a signal level criteria. It may be determined that beam forming is enabled at the first access node. Beam forming data may then be communicated between the first access node and a second access node. It may also be determined whether coordinated multipoint transmissions are enabled at the first access node. Beams transmitted from the first access node and the second access node may be adjusted based on whether coordinated multipoint transmissions are enabled from the first access node.

Figure 5:
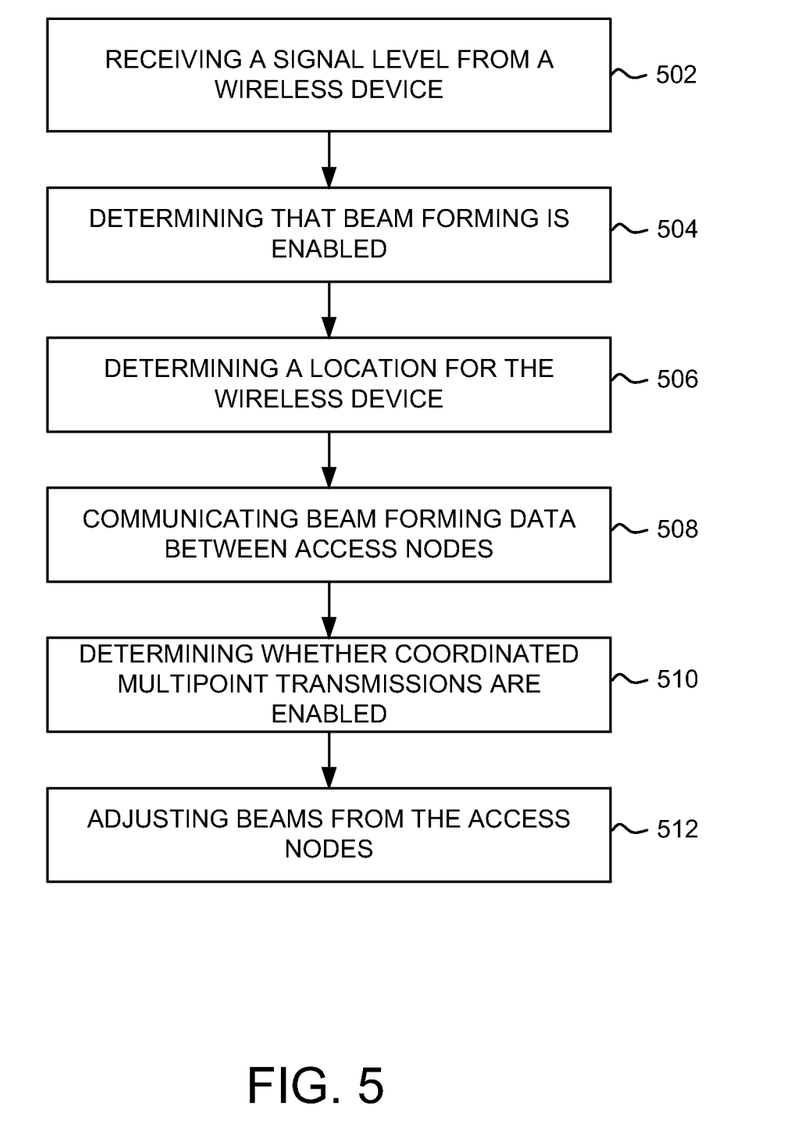
FIG. 5 illustrates another exemplary method of performing beam forming at multiple access nodes.

FIG. 5 illustrates an exemplary method for scheduling wireless resources with coordinated multipoint transmissions. The method will be discussed with reference to the exemplary communication system 400 illustrated in FIG. 4, however, the method can be implemented with any suitable communication system.

Referring to FIG. 5, at step 502, a signal level may be received from a wireless device at a first access node, where the signal level fails to meet a signal level criteria. For example, access node 408 may receive a signal level from wireless device 402. The signal level may comprise an indicator for a signal received at wireless device 402 from access node 408. In an embodiment, the signal level may comprise a channel quality indicator (CQI). The received CQI may be compared to a signal level criteria. For example, the signal level criteria may comprise a threshold signal level. A CQI that fails to meet the threshold may indicate poor channel quality for the wireless device. A CQI received at access node 408 from wireless device 402 may fail to meet the signal level criteria.

At step 504, it may be determined that beam forming is enabled at the first access node. For example, it may be determined that beam forming is enable at access node 408. In an embodiment, beam forming may be enabled based on conditions at the access node, such as load, number of connections to wireless devices (e.g., RRC connections), channel quality for connected wireless devices, application requirements from wireless devices, and other suitable conditions. For example, the load conditions at access node 408 may fall below a criteria (e.g., threshold), and subsequently beam forming may be enabled.

An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, a plurality of wireless device in communication with access node 408 (e.g., wireless devices 402, 404, and 406) may comprise a quality of service class identifier (QCI). Beam forming may be enabled at access node 408 based on the application requirements for the wireless devices (e.g., QCIs). For example, the application requirements for wireless devices in communication with access node 408 may meet an application requirement criteria (e.g., threshold), and subsequently beam forming may be enabled.

In an embodiment, interference experienced by one or more wireless devices in communication with access node 408 may meet an interference criteria (e.g., threshold), and subsequently beam forming may be enabled. The interference experienced by the wireless devices may be estimated based on a CQI for each wireless device.

At step 506, a location may be determined for the wireless device. For example, a location may be determined for wireless device 402. The location may be determined based on the received CQI, a global positioning system (GPS), a determined mobility, signal triangulation (e.g., using signal levels detected at the wireless device from multiple access nodes), and the like.

In an embodiment, wireless device 402 may communicate with a GPS system, and the GPS system may be used to determine a location. In another embodiment, a CQI for a wireless device may indicate a distance from access node 408. Accordingly, based on the CQI and other data (e.g., a sector for the serving access node, historic data about CQI measurements and associated determined locations, and the like) a location may be determined for wireless device 402. In another embodiment, signal triangulation may be used to determine a location. For example, a wireless device may receive signals from a plurality of access nodes (e.g. reference signals) at different signal levels. Based on the received signal levels, a distance from each access node may be determined. Accordingly, using the determined distances from each access node, a location may be determined for the wireless device. In an embodiment, a sounding reference signal may be transmitted from access node 408, and a location for wireless device 402 may be determined based on the sounding reference signal.

At step 508, beam forming data may be communicated between the first access node and a second access node. For example, beam forming data may be communicated between access node 408 and access node 410. Beaming forming data may comprise weights for antennas, phase and/or amplitudes for signals, pre-coding matrix indicators (PMIs), sounding reference signal (SRS) values, and the like.

For example, based on a location for wireless device 402, one or more weights may be calculated for antennas that transmit signals from access node 408. The weights may be a calculated such that constructive interference is experienced in the direction of wireless device 402 and destructive interference is experienced in other directions (e.g., away from wireless device 402). These weights may further comprise the beam forming data communicated between access nodes 408 and 410.

In another example, a sounding reference signal (SRS) may be transmitted from access node 408 to determine that channel quality for wireless device 402. The SRS may be transmitted periodically, and access node 408 may receive the results from the SRS and further determine a signal quality for wireless device 402. The results of the SRS (e.g., the determined signal quality for wireless device 402) may further comprise the beam forming data communicated between access nodes 408 and 410.

In an embodiment, coordinated multipoint transmission data may be communicated between access nodes 408 and 410 along with the beam forming data. For example, coordinated multipoint data may comprise scheduling data (e.g., physical resource block configuration, assigned frequency band for wireless device 402, transmission times, such as TTIs, and the like) from access node 408 such that access nodes 408 and 410 may coordinate signal transmissions to wireless device 402.

At step 510, it may be determined whether coordinated multipoint transmissions are enabled at the first access node. For example, it may be determined whether coordinated multipoint transmissions are enabled at access node 408. In an embodiment, coordinated multipoint transmissions may be enabled based on conditions at the access node, such as load, number of connections to wireless devices (e.g., RRC connections), channel quality for connected wireless devices, application requirements from wireless devices, conditions at neighboring access nodes (e.g., access node 410), and other suitable conditions.

For example, the load conditions at access node 408 may fall below a criteria (e.g., threshold), and subsequently coordinated multipoint transmissions may be enabled. In another example, the application requirements for wireless devices in communication with access node 408 may meet an application requirement criteria (e.g., threshold), and subsequently coordinated multipoint transmissions may be enabled.

In an embodiment, interference experienced by one or more wireless devices in communication with access node 408 may meet an interference criteria (e.g., threshold), and subsequently coordinated multipoint transmissions may be enabled. The interference experienced by the wireless devices may be estimated based on a CQI for each wireless device. In another example, when interference experienced by one or more wireless devices in communication with access node 408 meets a first interference criteria (e.g., first threshold), beam forming may be enabled, and when interference experienced by one or more wireless devices in communication with access node 408 meets a second interference criteria (e.g., second threshold), coordinate multipoint transmissions may be enabled. In an embodiment, the second criteria (second threshold) may be greater than the first criteria (first threshold).

At step 512, beams transmitted from the first access node and the second access node may be adjusted based on whether coordinated multipoint transmissions are enabled from the first access node. For examples, beams from access nodes 408 and 410 transmitted to wireless device 402 may be adjusted based on whether coordinated multipoint transmission are enabled from the access node 408. In an embodiment, one of 208B and 208C may comprise the adjusted beam from access node 408 and one of 208C and 210C may comprise the adjusted beam from access node 410. The adjusted beams may be transmitted over a frequency band assigned to wireless device 402 (e.g., assigned as the frequency band that access node 408 uses to communicate with wireless device 402).

In an embodiment, the first access node may narrow the beam transmitted node toward the wireless device and the second access node may narrow the beam transmitted node toward the wireless device when coordinated multipoint transmissions are enabled at the first access node. For example, when beam forming and coordinated multipoint transmissions are enabled at access node 408, access node 408 and access node 410 may narrow the beams transmitted from each access node toward wireless device 402. An exemplary illustration of two access nodes transmitting narrowed beams towards a wireless device is shown in FIG. 2B. In an embodiment, at least a portion of the beams transmitted from each of access nodes 408 and 410 comprises redundant data. For example, the adjusted beam transmitted from access nodes 408 and 410 may comprise a coordinated multipoint transmission.

In an embodiment, the first access node may narrow the beam transmitted node toward the wireless device and the second access node may adjust a beam transmitted from the second access node away from the wireless device when coordinated multipoint transmissions are not enabled at the first access node. For example, when beam forming is enabled but coordinated multipoint transmissions are not enabled at access node 408, access node 408 may narrow the beams transmitted from the access node toward wireless device 402 while access node 410 adjusts the beam transmitted from the access node away from wireless device 402. An exemplary illustration of a first access node transmitting a narrowed beam towards a wireless device and a second access node adjusting a beam away from the wireless device is shown in FIG. 2C.

In an embodiment, the first access node may narrow the beam transmitted node toward the wireless device and the second access node may adjust a beam transmitted from the second access node away from the wireless device when coordinated multipoint transmissions are not enabled at the second access node. For example, when beam forming and coordinated multipoint transmissions are enabled at access node 408, but coordinated multipoint transmissions are not enabled at access node 410, access node 408 may narrow the beams transmitted from the access node toward wireless device 402 while access node 410 adjusts the beam transmitted from the second access node away from wireless device 402.

In an embodiment, narrowing the beam transmitted from an access node towards a wireless device may comprise weighting a plurality of antennas at the access node such that a signal transmitted from the access nodes experiences constructive interference towards the location of the wireless device and destructive interference in other directions (e.g., away from the wireless device). In another embodiment, adjusting a beam transmitted from an access node away from a wireless device may comprise weighting a plurality of antennas at the access node such that a signal transmitted from the access nodes experiences destructive interference towards the location of the wireless device.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
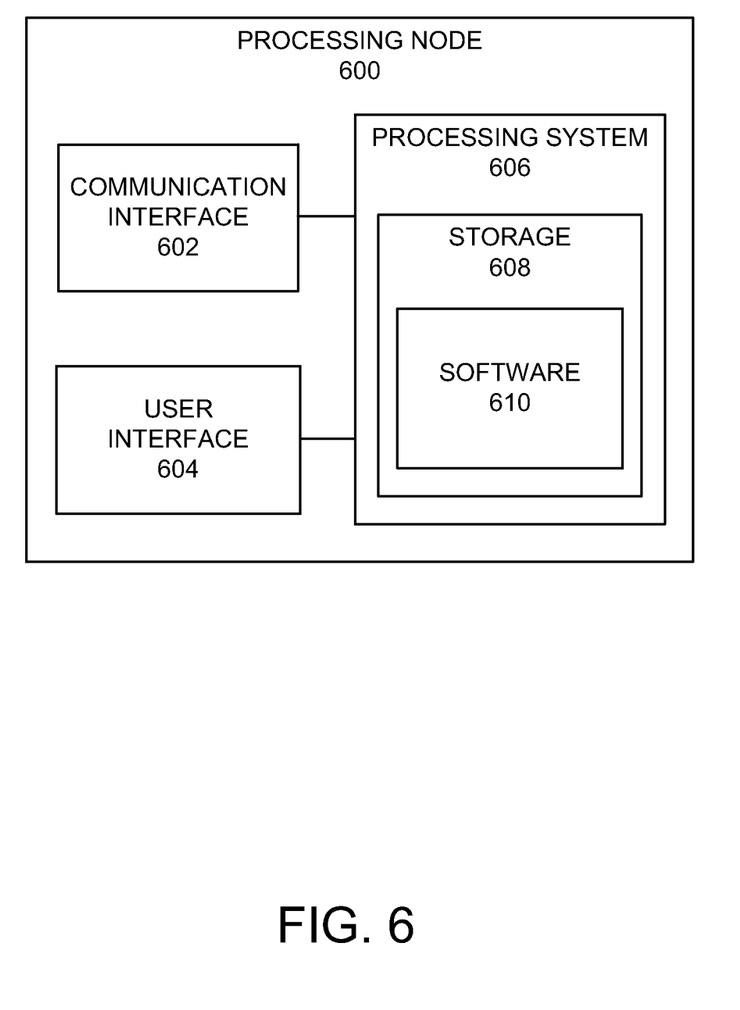
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 412 and gateway node 414. Processing node 600 can also be an adjunct or component of a network element, such as an element of access nodes 106 or 408 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing beam forming at multiple access nodes based on a wireless device, the method comprising:
    receiving at a first access node a signal level from the wireless device that fails to meet a signal level criteria;
    determining that beam forming is enabled at the first access node;
    communicating beam forming data between the first access node and a second access node;
    determining whether coordinated multipoint transmissions are enabled at the first access node; and
    adjusting, when coordinated multipoint transmissions are enabled from the first access node, a first beam transmitted from the first access node to narrow the first beam toward the wireless device and a second beam transmitted from the second access node to narrow the second beam toward the wireless device, wherein at least a portion of the first beam and the second beam comprise redundant data.

2. The method of claim 1, wherein the first and the second beams comprise a coordinated multipoint transmission.

3. The method of claim 1, wherein the first access node narrows the first beam toward the wireless device and the second access node adjusts the second beam away from the wireless device when coordinated multipoint transmissions are not enabled at the first access node.

4. The method of claim 1, further comprising:
    determining a location for the wireless device; and
    adjusting the first and second beams based on the location for the wireless device.

5. The method of claim 1, wherein the first access node narrows the first beam toward the wireless device and the second access node adjusts the second beam away from the wireless device when coordinated multipoint transmissions are not enabled at the second access node.

6. The method of claim 1, wherein the beam forming data communicated between the first access node and the second access node comprises at least one of antenna weights, signal phases, signal amplitudes, pre-coding matrix indicators, and sounding reference signal values.

7. The method of claim 1, further comprising:
    communicating beam forming data and coordinated multipoint transmission data between the first access node and the second access node.

8. The method of claim 1, wherein the first access nodes and the second access node comprise a plurality of antennas performing a MIMO protocol.

9. A system for performing beam forming at multiple access nodes based on a wireless device, the system comprising:
    a processing node with a processor configured to:
        receive at a first access node a signal level from the wireless device that fails to meet a signal level criteria;
        determine that beam forming is enabled at the first access node;
        communicate beam forming data between the first access node and a second access node;
        determine whether coordinated multipoint transmissions are enabled at the first access node; and
        adjust, when coordinated multipoint transmissions are enabled from the first access node, a first beam transmitted from the first access node to narrow the first beam toward the wireless device and a second beam transmitted from the second access node to narrow the second beam toward the wireless device, wherein at least a portion of the first beam and the second beam comprise redundant data.

10. The system of claim 9, wherein the first and the second beams comprise a coordinated multipoint transmission.

11. The system of claim 9, wherein the first access node narrows the first beam toward the wireless device and the second access node adjusts the second beam away from the wireless device when coordinated multipoint transmissions are not enabled at the first access node.

12. The system of claim 9, wherein the processing node is further configured to:
    determine a location for the wireless device; and
    adjust the first and second beams based on the location for the wireless device.

13. The system of claim 9, wherein the first access node narrows the first beam toward the wireless device and the second access node adjusts the second beam away from the wireless device when coordinated multipoint transmissions are not enabled at the second access node.

14. The system of claim 9, wherein the beam forming data communicated between the first access node and the second access node comprises at least one of antenna weights, signal phases, signal amplitudes, pre-coding matrix indicators, and sounding reference signal values.

15. The system of claim 9, wherein the processing node is further configured to:
    communicate beam forming data and coordinated multipoint transmission data between the first access node and the second access node.

16. The system of claim 9, wherein the first access nodes and the second access node comprise a plurality of antennas performing a MIMO protocol.

* * * * *